United States Patent
Murayama et al.

(10) Patent No.: US 8,063,939 B2
(45) Date of Patent: Nov. 22, 2011

(54) IMAGE PROCESSING DEVICE, IMAGE PICKING-UP DEVICE, IMAGE PROCESSING METHOD, AND PROGRAM

(75) Inventors: Jun Murayama, Tokyo (JP); Masahiro Watanabe, Osaka (JP); Atsushi Ito, Tokyo (JP); Seiji Kobayashi, Tokyo (JP); Yoichi Yagasaki, Tokyo (JP); Kenji Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 518 days.

(21) Appl. No.: 12/294,470

(22) PCT Filed: Feb. 7, 2008

(86) PCT No.: PCT/JP2008/052041
§ 371 (c)(1),
(2), (4) Date: Sep. 25, 2008

(87) PCT Pub. No.: WO2008/096818
PCT Pub. Date: Aug. 14, 2008

(65) Prior Publication Data
US 2010/0225772 A1   Sep. 9, 2010

(30) Foreign Application Priority Data
Feb. 7, 2007   (JP) .................................. 2007-028389

(51) Int. Cl.
*H04N 5/228*   (2006.01)

(52) U.S. Cl. .................................................. 348/208.4
(58) Field of Classification Search ................ 348/208.4
See application file for complete search history.

(56) References Cited

U.S. PATENT DOCUMENTS

| 7,856,055 B2* | 12/2010 | Zhou et al. ............... 375/240.12 |
| 2004/0091170 A1* | 5/2004 | Cornog et al. ................ 382/276 |
| 2007/0070221 A1 | 3/2007 | Nishi et al. |

FOREIGN PATENT DOCUMENTS

| JP | 11 112939 | 4/1999 |
| JP | 2005 080028 | 3/2005 |
| JP | 2006 81150 | 3/2006 |
| JP | 2007 274299 | 10/2007 |

\* cited by examiner

*Primary Examiner* — James Hannett
(74) *Attorney, Agent, or Firm* — Oblon, Spivak, McClelland, Maier & Neustadt, L.L.P.

(57) ABSTRACT

An image processing apparatus (1), for performing image processing on image data which is obtained by performing imaging of a subject and in which the degree of motion blurring of an image represented by the image data changes in accordance with an imaging condition at the time of performing imaging of the subject, includes a motion information correcting unit (12) for correcting motion information representing motion concerning the image on the basis of imaging information representing the imaging condition, and a motion blurring adding unit (13) for adding motion blurring to the image by using the motion information corrected by the motion information correcting means to perform image processing on the image data.

14 Claims, 11 Drawing Sheets

IMAGE PROCESSING DEVICE, IMAGE PICKING-UP DEVICE, IMAGE PROCESSING METHOD, AND PROGRAM

TECHNICAL FIELD

The present invention relates to an image processing apparatus, an imaging apparatus, and an image processing method that perform image processing that adds motion blurring to a moving image, and a program that causes a computer to execute the image processing.

This application claims the benefit of Japanese Patent Application No. 2007-028389 filed on Feb. 7, 2007 in Japan, which is hereby incorporated by reference herein in its entirety.

BACKGROUND ART

When a display device is used to display a moving image in which each frame is taken in a short effective exposure time for a period determined at a frame rate by an imaging apparatus having a shutter function, visual image deterioration may occur in which motion of a moving object included in the image is displayed in a discontinuous manner and an observer who observes the image perceives a different superimposed image.

Such moving image deterioration based on unnatural motion is generally called motion jerkiness (reference document: ANSI T1.801.02-1996).

DISCLOSURE OF INVENTION

Technical Problem

A specific example in which motion jerkiness occurs will be described using the moving image imaging apparatus 500 and moving image reproduction apparatus 600 shown in FIG. 11.

The moving image imaging apparatus 500 takes a moving image, codes the moving image by using a coding method such as the MPEG (Moving Picture Experts Group), and records the coded image data on a recording medium 700 such as a DVD (Digital Versatile Disc). The moving image imaging apparatus 500 specifically has the following configuration.

In other words, the moving image imaging apparatus 500 includes an imaging optical system 510 that collects light from a subject image, an imaging element 520 that receives the light collected by the imaging optical system 510 and that converts the light into an image signal, a coding processing unit 530 that codes the image signal obtained by the conversion in the imaging element 520, a transmitting processing unit 540 that transmits the image data coded by the coding processing unit 530 to the exterior via a transmission line, and a recording processing unit 550 that records the image data coded by the coding processing unit 530 on the recording medium 700 such as a DVD (Digital Versatile Disc).

In addition, the imaging optical system 510 includes an aperture mechanism 511 that adjusts the amount of light incident from the exterior, and an optical lens system 512 that collects, on a light receiving surface of the imaging element 520, subject light whose amount of light is adjusted by the aperture mechanism 511.

On the other hand, the moving image reproduction apparatus 600 decodes the coded image data and displays an output on a display or the like, and specifically has the following configuration. In other words, the moving image reproduction apparatus 600 includes a receiving processing unit 610 that receives the coded image data transmitted via the transmission line, a reproduction processing unit 620 that reproduces the coded image data from the recording medium 700, a decoding processing unit 630 that decodes the coded image data output from the receiving processing unit 610 and the reproduction processing unit 620, and a display output unit 640, such as a display, that displays an image signal obtained by decoding in the decoding processing unit 630.

For example, when a moving image is taken in a well-lighted outside area, the moving image imaging apparatus 500 closes the aperture mechanism 511 to limit the amount of light incident on the imaging element 520, whereby the amount of exposure is appropriately controlled. However, normally, when the aperture mechanism 511 is excessively closed, an image is blurred due to a diffraction phenomenon. Thus, in the moving image imaging apparatus 500, in addition to adjustment of the amount of light by using the aperture mechanism 511, appropriate exposure control is performed by increasing a shutter speed representing the ratio of an effective exposure time of each frame to a period determined by a frame rate. In addition, in a moving imaging apparatus that is not provided with the aperture mechanism, by changing the shutter speed, exposure control is performed.

In the moving image imaging apparatus 500 having the above-described configuration, by increasing the shutter speed, appropriate exposure control is performed at the time of imaging in the field. In connection therewith, image deterioration caused by the above jerkiness occurs.

In other words, in a case where the moving image imaging apparatus 500 performs imaging including jerkiness deterioration, the moving image reproduction apparatus 600 directly decodes image data including the jerkiness deterioration and displays the decoded data through the display output unit 640.

As described above, regarding an image in which an effective exposure period is short for a period determined by a moving image frame rate in such a manner that imaging is performed at a fast shutter speed by an imaging apparatus having a shutter function capable of controlling a shutter speed, when the image is displayed as a still image, it has high sharpness, while, when the image is displayed as a moving image, motion of a moving body in the image is not smooth, and the image looks unnatural based on human visual characteristics.

The present invention has been proposed in view of such circumstances. It is an object of the present invention to provide an image processing apparatus, an imaging apparatus, an image processing method, and a program in which jerkiness deterioration is reduced by adding appropriate motion blurring to a moving image taken in by the imaging apparatus, which has a shutter function.

As means for solving the above-described problems, an image processing apparatus according to the present invention is an image processing apparatus for performing image processing on image data which is obtained by performing imaging of a subject and in which the degree of motion blurring of an image represented by the image data changes in accordance with an imaging condition at the time of performing imaging of the subject, the image processing apparatus including: motion information correcting means for correcting motion information representing motion concerning the image on the basis of imaging information representing the imaging condition; and motion blurring adding means for adding motion blurring to the image by performing image processing on the image data using the motion information corrected by the information correcting means. In addition, an imaging apparatus according to the present invention includes: imaging means for outputting, by performing imaging of a subject, image data in which the degree of motion blurring of an image represented by the image data changes in accordance with an imaging condition, the image data being obtained by performing imaging; motion information correcting means for correcting motion information representing motion concerning the image on the basis of imaging information representing the imaging condition; and motion blurring adding means for adding motion blurring to the image by using the motion information corrected by the motion information correcting means to perform image processing on the image data.

In addition, an image processing method according to the present invention is an image processing method for performing image processing on image data which is obtained by performing imaging of a subject and in which the degree of motion blurring of an image represented by the image data changes in accordance with an imaging condition at the time of performing imaging of the subject, the image processing method including: a motion information correcting step of correcting motion information representing motion concerning the image on the basis of imaging information representing the imaging condition; and a motion blurring adding step of adding motion blurring to the image by performing image processing on the image data using the motion information corrected in the motion information correcting step. In addition, a program according to the present invention is a program for causing a computer to execute an image processing method for performing image processing on image data which is obtained by performing imaging of a subject and in which the degree of motion blurring of an image represented by the image data changes in accordance with imaging condition at the time of performing imaging of the subject, the image processing method including: a motion information correcting step of correcting motion information representing motion concerning the image on the basis of imaging information representing the imaging condition; and a motion blurring adding step of adding motion blurring to the image by using the motion information corrected in the motion information correcting step to perform image processing on the image data.

Another object of the present invention and specific advantages obtained by the present invention become more apparent from the following description of embodiments.

BEST MODES FOR CARRYING OUT THE INVENTION

Best modes for practicing the present invention will be described below with reference to the drawings.

Figure 1:
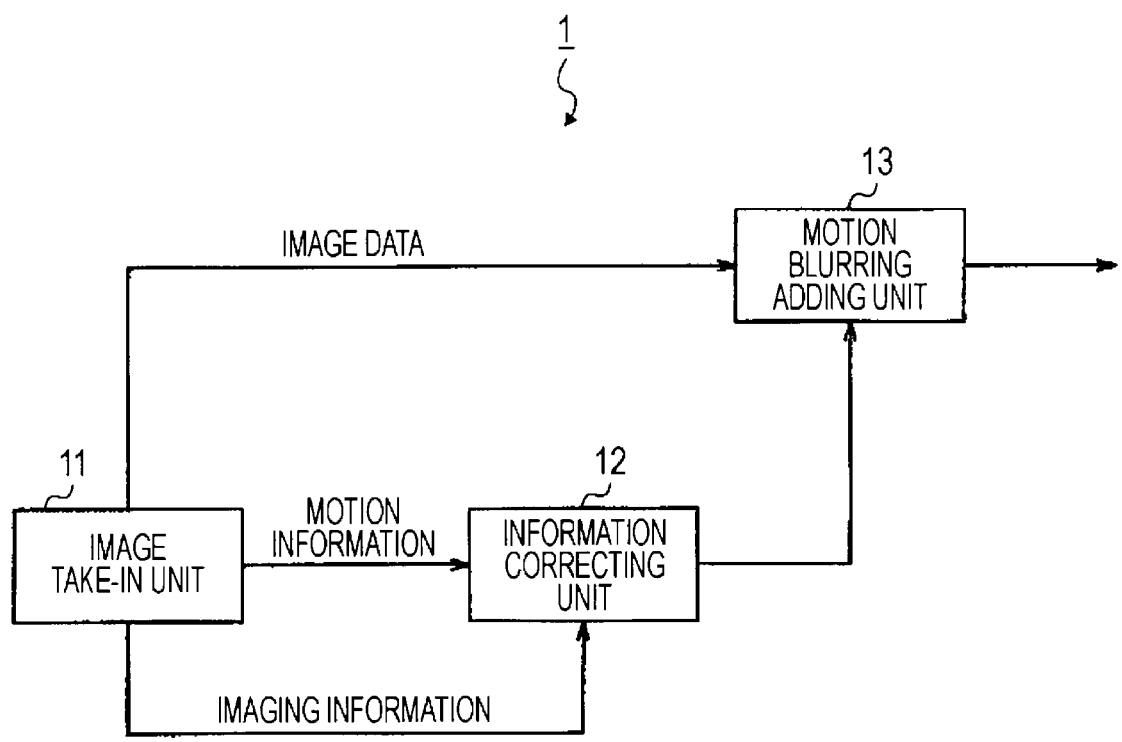
FIG. 1 is a block diagram showing the configuration of an image processing apparatus to which the present invention is applied.

An image processing apparatus to which the present invention is applied adaptively adds motion blurring to a moving image that includes jerkiness deterioration and looks unnatural based on human visual characteristics, thereby reducing this deterioration. This is realized by, for example, the image processing apparatus 1 shown in FIG. 1.

In other words, the image processing apparatus 1 is a processing apparatus that performs image processing on image data in which the degree of motion blurring of an image represented by the image data changes in accordance with an imaging condition at the time of performing imaging of a subject, and includes an image take-in unit 11 that takes in the image data obtained by taking the image of the subject, a motion information correcting unit 12 that corrects motion information representing motion of an image of the image data taken in by the image take-in unit 11, and a motion blurring adding unit 13 that adds motion blurring to the image by performing image processing on the image data taken in by the image take-in unit 11.

The motion information correcting unit 12 corrects the motion information representing motion of the image of the image data on the basis of imaging information such as a shutter speed representing the ratio of an effective exposure time of each frame to a period determined by a frame rate of the image data taken in by the image take-in unit 11, and supplies the corrected motion information to the motion blurring adding unit 13.

Here, the imaging information may be, among various condition set by an imaging apparatus at the time of taking an image of a subject, any imaging condition information that changes the degree of motion blurring of the image represented by the image data, and is not limited to the information representing the above-described shutter speed.

In addition, the motion information is not limited to information representing an image motion between frames, but may be any information representing image-related motion when the image data is treated as a moving image, such as, for example, information representing motion of an image between fields.

The motion blurring adding unit 13 adds motion blurring to the image data by using the motion information corrected by the motion information correcting unit 12, and outputs the resultant data to the exterior of the image processing apparatus 1.

In the image processing apparatus 1 having the above-described configuration, by adaptively adding motion blurring to image data on the basis of imaging information representing an imaging condition that change the degree of motion blurring of an image represented by the image data, the motion blurring is added to a moving image that includes jerkiness deterioration and looks unnatural based on human visual characteristics, whereby the deterioration is reduced.

In the following, by using first and second embodiments, specific processing details of the above-described image processing apparatus 1 will be described.

First Embodiment

First, the reception/reproduction apparatus 100 shown in FIG. 2 that receives image data transmitted via a transmission line or reproduces image data recorded on a recording medium 200 such as a DVD will be described as an image processing apparatus according to a first embodiment to which the image processing apparatus 1 is applied.

Figure 2:
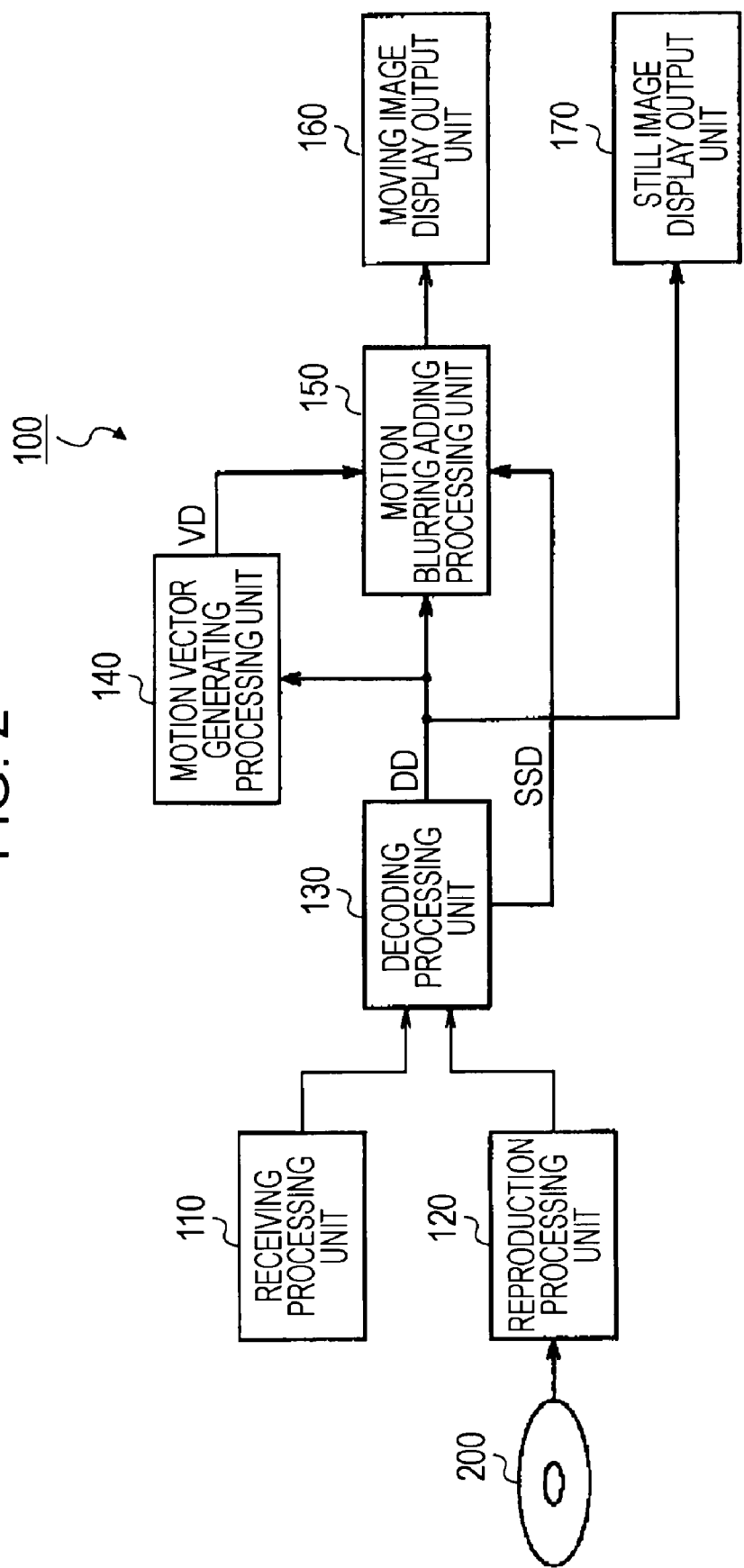
FIG. 2 is a block diagram showing an entire configuration of a reception/reproduction apparatus according to a first embodiment.

The reception/reproduction apparatus 100 includes, as shown in FIG. 2, a receiving processing unit 110 that receives coded image data transmitted via a transmission line, a reproduction processing unit 120 that reproduces coded images from the recording medium 200, a decoding processing unit 130 that decodes the coded image data into decoded image data DD, a motion vector generating processing unit 140 that generates a motion vector VD from the decoded image data DD, a motion blurring adding processing unit 150 that adds, to the decoded image data DD, motion blurring according to a motion vector, a moving image display output unit 160 that causes a display apparatus to display a moving image in which jerkiness deterioration is reduced by adding the motion blurring, and a still image display output unit 170 that causes the display apparatus to display a decoded image as a still image.

Each of the receiving processing unit 110 and the reproduction processing unit 120 is a processing unit that takes in image data which is predictive-coded on the basis of motion information of an image such as an MPEG standard, and that supplies the image data to the decoding processing unit 130.

Meanwhile, the reception/reproduction apparatus 100 may have, as a function of capturing the image data from the exterior, at least one of the receiving processing unit 110 and the reproduction processing unit 120.

Moreover, in addition to capturing of the image data from the exterior, the reception/reproduction apparatus 100 takes in, as imaging information concerning the image data, shutter speed information representing a shutter speed SSD. Meanwhile, the shutter speed information may be included in metadata of the image data.

Here, the shutter speed information is imaging information representing an imaging condition that changes the degree of motion blurring of an image represented by image data, as described above. Specifically, the shutter speed information represents the ratio of an effective exposure time of each unit image to a period determined at a frame rate when image data is taken by an imaging apparatus having a shutter function.

In addition, shutter functions are realized by an electronic shutter that controls an effective exposure time of an imaging element, a mechanical shutter that allows light from a lens to pass to the side of an imaging element in such a manner that the shutter is released during an effective exposure time by using an opening/closing mechanism, a liquid crystal shutter that allows light from a lens to pass to the side of an imaging element during an effective exposure time by controlling the transmittance of a liquid crystal element, etc.

In addition, it is assumed that the image data that is taken in as a moving image by the receiving processing unit 110 and the reproduction processing unit 120 has a unit time of one second and is made up of 60 frames of images per the unit time. In other words, this embodiment will be described below assuming that the image data is made up of a unit image in a progressive format in which a frame rate is [fps: frame per second]. Meanwhile, the image data is not limited to the progressive format, but may be made up of an interlace system in which processing is performed in units of field images. In addition, the frame rate is not limited to only 60 [fps] used in this embodiment.

The decoding processing unit 130 decodes the image data taken in from the receiving processing unit 110 or the reproduction processing unit 120. Meanwhile, at this decoding time, together with the image data, the decoding processing unit 130 takes in the shutter speed information as imaging information concerning the image data. Since the shutter speed information has a small amount of data, there is less necessity to compress the image data in a form in which it includes the shutter speed information. Thus, in a case where the shutter speed information is not compressed, it may be simply separated from the image data. In addition, in a case where the image data includes the shutter speed information as metadata, the decoding processing unit 130 may also decode the shutter speed information.

Further, the decoding processing unit 130 supplies this decoded image data DD to the motion vector generating processing unit 140. In addition, the decoding processing unit 130 supplies the decoded image data DD and its shutter speed information to the motion blurring adding processing unit 150.

In addition, when the decoding processing unit 130 processes the decoded image data DD as a still image, the decoding processing unit 130 supplies the decoded image data DD only to the still image display output unit 170 and does not need to process the decoded image data DD as a moving image.

From the decoded image data DD supplied from the decoding processing unit 130, the motion vector generating processing unit 140 generates a motion vector VD as motion information of the decoded image data DD. Here, a motion vector is information representing a moving position and moving direction of a moving image between frames. In this embodiment, a frame image subject to current processing is called a processing object frame, and a frame image that is one frame before the processing object frame is called a previous frame.

In addition, to accurately obtain motion information of a moving body, motion vectors can be generated in units of pixels. However, in order to reduce a calculating load, the motion vector generating processing unit 140 according to this embodiment generates motion vectors in units of pixel blocks each obtained by dividing a frame image into a plurality of regions.

Meanwhile, image data coded in accordance with an MPEG standard or the like include a motion vector as motion information for performing coding processing. In this embodiment, the motion vector as this coding information can be also used, and employment of the motion vector is meaningful in reducing processing. However, the motion vector as coding information is consistently information for coding a moving image, and the coding processing is performed in combination of residual information or the like other than the motion vector. Thus, it may not be said that the motion vector faithfully represents a value according to an actual motion of a moving body over the entirety of an image.

Hence, in this embodiment, in order to add motion blurring that is faithful to actual motion of the moving body, the motion vector generating processing unit 140 accurately detects, as new motion information different from the motion information for performing the coding processing, a motion vector according to actual motion of a moving body in a decoded image in a processing process, which is described later.

Meanwhile, the reception/reproduction apparatus 100 accurately detects the motion vector by using the decoded image data DD, as described above, and can reduce jerkiness deterioration by using the motion vector to add motion blurring to the image in an appropriate size/direction. Hence, in this standpoint, it is not always necessary to correct the motion vector on the basis of imaging information representing an imaging condition that change the degree of motion blurring of the image represented by the image data.

The motion blurring adding processing unit 150 specifically uses the processing process, which is described later, to add motion blurring to the decoded image data DD supplied from the decoding processing unit 130 in accordance with the shutter speed information and the motion vector VD supplied from the motion vector generating processing unit 140.

The moving image display output unit 160 outputs, as a moving image, on a display apparatus such as an LCD, a moving image in which jerkiness deterioration has been reduced in such a manner that the motion blurring adding processing unit 150 adds the motion blurring.

The still image display output unit 170 outputs, to the display apparatus such as an LCD, as a still image, the decoded image data DD supplied from the decoding processing unit 130.

Next, the configuration and operation of the motion vector generating processing unit 140 will be described.

Figure 3:
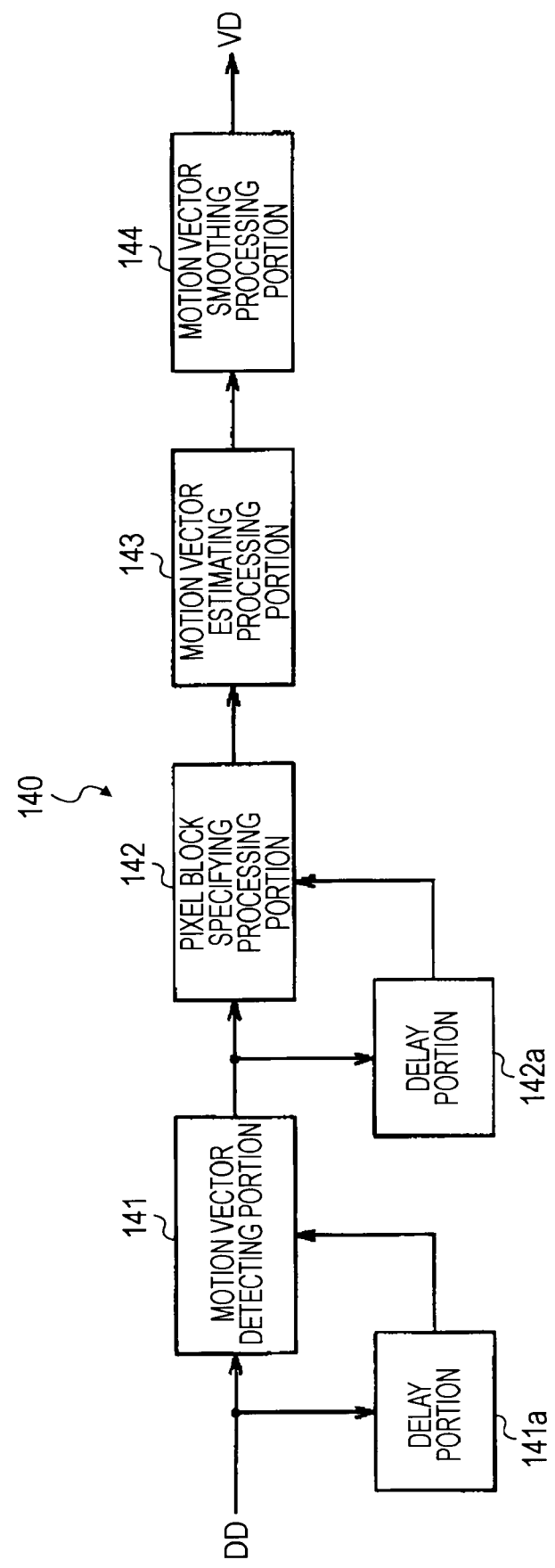
FIG. 3 is a block diagram showing the configuration of a motion vector generating processing unit.

The motion vector generating processing unit 140 is a part that accurately generates motion vectors in units of pixel blocks, as described above. Specifically, as shown in FIG. 3, the motion vector generating processing unit 140 includes a motion vector detecting portion 141 that detects a motion vector from the processing object frame and the previous frame, a pixel block specifying processing portion 142 that specifies a pixel block having high correlation by comparing a motion vector in the processing object frame and a motion vector in the previous frame for each pixel block, a motion vector estimating processing portion 143 that estimates, from a motion vector in the pixel block specified by the pixel block specifying processing portion 142, a motion vector in a different pixel block, and a motion vector smoothing processing portion 144 that performs smoothing processing on the motion vector.

A delay portion 141a that delays the decoded image data DD supplied from the decoding processing unit 130 for one frame is provided for the motion vector detecting portion 141. The motion vector detecting portion 141 uses, as a processing object frame, the decoded image data DD supplied from the decoding processing unit 130, and detects a motion vector of the processing object frame from the processing object frame and a previous frame that is delayed for one frame by the delay portion 141a in units of pixel blocks. The motion vector detecting portion 141 supplies the detected motion vector to the pixel block specifying processing portion 142.

Meanwhile, in a case where processing of the motion vector detecting portion 141 is implemented by software, motion vectors may be detected in units of pixel blocks by using a common block matching method.

A delay portion 142a that delays the motion vector supplied from the motion vector detecting portion 141 for one frame is provided for the pixel block specifying processing portion 142. The pixel block specifying processing portion 142 compares the motion vector of the processing object frame which is supplied from the motion vector detecting portion 141, and the motion vector of the previous frame that is delayed by the delay portion 142a, in units of pixel blocks, as shown below, and specifies a pixel block having high correlation from the result of comparison.

Specifically, when a motion vector of one pixel block in the processing object frame is represented by (x, y), a corresponding motion vector of a pixel block in the previous frame is represented by (x', y'), and an arbitrarily determined correlation determination coefficient is represented by α, the pixel block specifying processing portion 142 uses the following expression (1) to calculate a vector correlation coefficient σ of this pixel block.

[Expression 1]

$$\sigma = \begin{cases} 1: \begin{cases} \begin{cases} \alpha \times x < x' < (2-\alpha) \times x \\ \& \\ \alpha \times y < y' < (2-\alpha) \times y \end{cases} \\ \therefore \\ (\text{case})x = 0 \\ -(1-\alpha) \times y < x' < (1-\alpha) \times y \\ (\text{case})y = 0 \\ -(1-\alpha) \times x < y' < (1-\alpha) \times x \end{cases} \\ 0: \text{Others} \end{cases} \quad \text{Expression (1)}$$

Meanwhile, the correlation determination coefficient α has a domain of 0<α<1 and is a coefficient in which, as the value of α is greater, the value of the vector correlation coefficient σ is calculated as 1.

The pixel block specifying processing portion 142 calculates the vector correlation coefficient σ of each pixel block from the above expression (1), and specifies, as a pixel block having a high correlation motion vector, a pixel block in which vector correlation coefficient σ is 1.

From a motion vector of the pixel block, specified by the pixel block specifying processing portion 142 as having the value of the vector correlation coefficient σ is 1, the motion vector estimating processing portion 143 estimates a motion vector of a pixel block in which its vector correlation coefficient σ is 0.

In other words, assuming that a pixel block specified by the pixel block specifying processing portion 142 as having the value of the vector correlation coefficient σ of 1, the motion vector estimating processing portion 143 updates a different pixel block, that is, a motion vector of a pixel block in which the value of vector correlation coefficient σ is 0 and which has a motion vector that is not effective.

Figure 4:
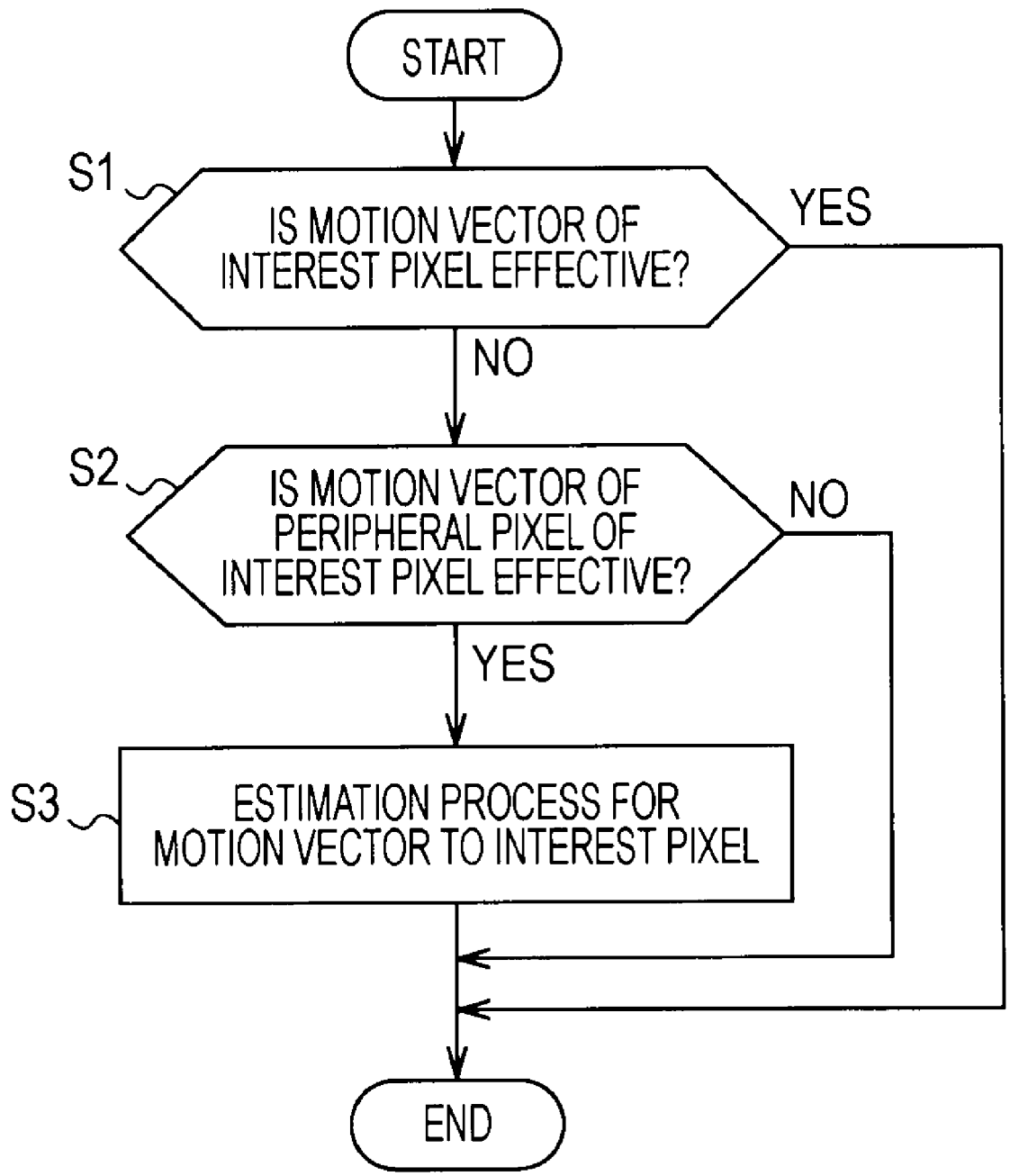
FIG. 4 is a flowchart illustrating a processing process performed by a motion vector estimating processing portion.

A specific processing process of the motion vector estimating processing portion 143 will be described in detail with reference to FIG. 4.

In step S1, the motion vector estimating processing portion 143 determines whether the vector correlation coefficient α of a pixel block (hereinafter referred to as an interest pixel block) subject to current processing in the processing object frame is 1 or 0. In other words, the motion vector estimating processing portion 143 determines whether or not the motion vector of this pixel block is effective. Additionally, the motion vector estimating processing portion 143 terminates this processing process without updating the value of the motion vector when the motion vector of this pixel block is effective, and proceeds to step S2 when the motion vector of this pixel block is not effective.

In step S2, the motion vector estimating processing portion 143 determines whether or not, for the interest pixel block, a peripheral pixel block that has an effective vector exists around the interest pixel block. Specifically, the motion vector estimating processing portion 143 determines whether or not effective motion vectors exist for a total of eight pixel blocks, as peripheral pixel blocks, adjacent to the interest pixel block. When the effective motion vectors exist, the motion vector estimating processing portion 143 proceeds to step S3, and, when the effective motion vectors do not exist, the motion vector estimating processing portion 143 terminates this processing process without updating the motion vector of this interest pixel block.

Here, the reason that estimating processing is not performed for an interest pixel block in which no effective motion vector exists by using peripheral pixel blocks positioned in a broader range is as follows.

A first reason is that, although estimating processing can be performed by using pixel blocks positioned in a broader range, if the processing is realized, in order for this processing process to terminate as fixed time processing, a storage area for temporarily storing image data that is treated as the peripheral pixel blocks is increased.

A second reason is that, in a post stage in this processing process, by performing smoothing processing on the motion vector of the interest pixel block by using peripheral pixel blocks in a range broader than the total of the above-described eight adjacent pixel blocks, motion vectors that are not effective can be appropriately corrected.

In step S3, the motion vector estimating processing portion 143 estimates and updates the motion vector of this interest pixel block only from motion vectors of the peripheral blocks having effective motion vectors, and terminates this process. As one example of the estimating processing, the motion vector estimating processing portion 143 outputs and smoothes the motion vector of the interest pixel block by using a median filter that receives only motion vectors of the peripheral pixel blocks having effective motion vectors.

As described above, the motion vector estimating processing portion 143 estimates motion vectors in the processing object frame in units of pixel blocks. Additionally, the motion vector estimating processing portion 143 supplies the motion vector smoothing processing portion 144 with motion vectors including the motion vectors specified by the pixel block specifying processing portion 142.

The motion vector smoothing processing portion 144 performs smoothing processing on the motion vector of each pixel block included in an image to be processed. Specifically, the motion vector smoothing processing portion 144 receives, as input I (x+i, y+j), the motion vector of the interest pixel block before the smoothing processing and motion vectors of peripheral pixel blocks in a range broader than the above adjacent pixel blocks, and outputs a motion vector J(x, y) of the interest pixel block after the smoothing processing on the basis of the Gaussian function represented by the following expression (2).

[Expression 2]

$$J(x, y) = \left( \frac{\sum I(x+i, y+j) * e^{\frac{r^2}{2\sigma^2} \frac{(I(x+i,y+j)-I(x,y))^2}{t^2}}}{\sum e^{\frac{r^2}{2\sigma^2} \frac{(I(x+i,y+j)-I(x,y))^2}{t^2}}} \right) \quad \text{Expression (2)}$$

Here, r represents a distance in two-dimensional space between the interest pixel block and each peripheral pixel block, $\sigma^2$ represents a variance concerning the distance r, and $t^2$ represents a variance concerning a motion vector. In other words, $\sigma^2$ and $t^2$ are arbitrarily set parameters as values representing the degree of smoothing.

The motion vector smoothing processing portion 144 performs the above-described smoothing processing on each pixel block included in the processing object frame, and supplies a motion vector VD to the motion blurring adding processing unit 150.

In this manner, the motion vector smoothing processing portion 144 specifies a pixel block having an effective motion vector from each pixel block included in the processing object frame, and estimates a different motion vector from the effective motion vector. Thus, the motion vector smoothing processing portion 144 can accurately generate a motion vector according to actual motion of a moving body.

Meanwhile, in the motion vector generating processing unit 140, the motion vector detected by the motion vector detecting portion 141 may be directly supplied and smoothed in the motion vector smoothing processing portion 144 not via the pixel block specifying processing portion 142 and the motion vector estimating processing portion 143. Even in a case which such processing is performed, compared with the motion vector, an accurate motion vector according to actual motion of a moving body can be generated as the above-described coded information.

Next, a specific configuration of the motion blurring adding processing unit 150 will be described in detail with reference to FIG. 5.

Figure 5:
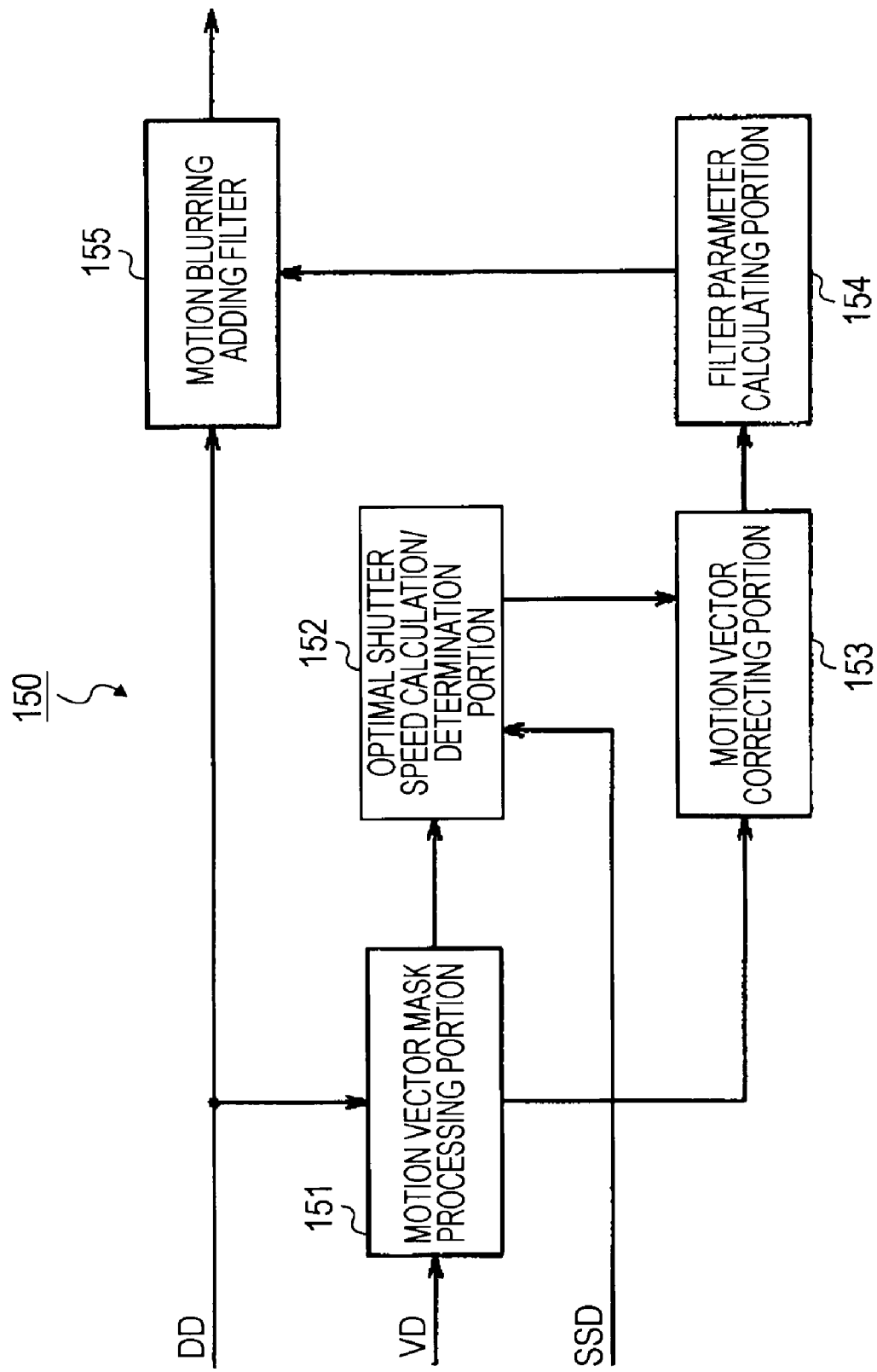
FIG. 5 is a block diagram showing the configuration of a motion blurring adding processing unit.

The motion blurring adding processing unit 150 includes, as shown in FIG. 5, a motion vector mask processing portion 151 that generates a motion vector mask information that specifies an image region to which motion blurring is added, an optimal shutter speed calculation/determination portion 152 that calculates an appropriate shutter speed (hereinafter referred to as optimal shutter speed information) according to a motion vector, and that performs determining processing, which is described later, by comparing the optimal shutter speed information, and shutter speed information at the time a moving image was actually taken, a motion vector correcting portion 153 that corrects the motion vector on the basis of a determination result of the optimal shutter speed calculation/determination portion 152, a filter parameter calculating portion 154 that calculates filter parameters for adding motion blurring in accordance with each pixel of the processing object frame, and a motion blurring adding filter 155 that performs motion blurring filtering processing on the pixel value of each pixel of the processing object frame.

Here, entire processing can be performed in units of pixels. However, to reduce a calculating load, processing concerning the motion vector mask processing portion 151, the optimal shutter speed calculation/determination portion 152, and the motion vector correcting portion 153 is performed in units of pixel blocks. In addition, since the filter parameter calculating portion 154 and the motion blurring adding filter 155 correspond to filtering processing that adds motion blurring to the decoded image data DD, the processing is performed not in units of pixel blocks but in units of pixels.

Figure 6:
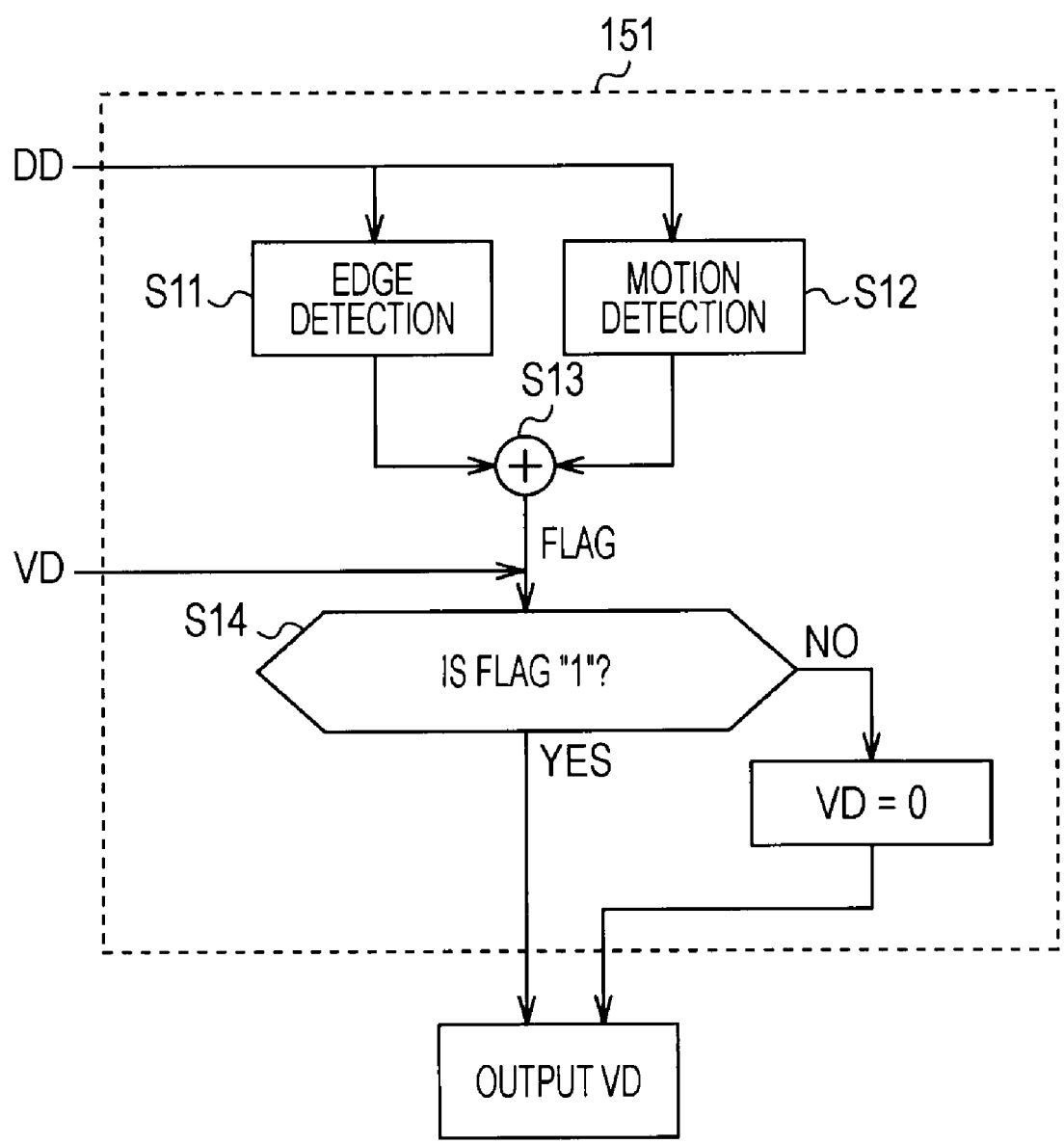
FIG. 6 is a schematic diagram showing a specific processing process according to a motion vector mask processing portion.

In order to specify, in the processing object frame, an image region to which motion blurring is added, the motion vector mask processing portion 151 performs the mask processing shown in FIG. 6 on the pixel-block-unit motion vector VD supplied from the motion vector generating processing unit 140, and supplies the pixel-block-unit motion vector obtained by the mask processing to the optimal shutter speed calculation/determination portion 152 and the motion vector correcting portion 153.

Here, image regions to which motion blurring needs to be added and in which jerkiness deterioration easily occurs concentrate particularly in a moving body image region in the screen and image regions around edges.

Hence, the motion vector mask processing portion 151 uses the processing shown in FIG. 6 to output, as an effective value, only a motion vector of a pixel block at the periphery of an edge in which jerkiness easily occurs and which has high spatial contrast. In other words, in step S11, for the decoded image data DD supplied from the decoding processing unit 130, in units of pixel blocks, the motion vector mask processing portion 151 detects an image edge, as processing that specifies a region in the processing object frame which has high spatial contrast.

In addition, in parallel to processing in step S11, in step S12, the motion vector mask processing portion 151 detects a moving body image region by calculating an interframe difference in units of pixel blocks, as processing that specifies a moving body region in the processing object frame.

In step S13, by performing processing concerning one or both of the above-described steps S11 and S12, the motion vector mask processing portion 151 determines, in units of pixel blocks, whether to have detected each pixel block unit as a region in which jerkiness easily occurs. Additionally, for a pixel block determined to be a region in which jerkiness deterioration easily occurs, the motion vector mask processing portion 151 sets a mask processing flag to "1". In addition, for a pixel block determined not to be a region in which jerkiness easily occurs, the motion vector mask processing portion 151 sets the mask processing flag to "0".

In step S14, for the motion vector VD supplied from the motion vector generating processing unit 140, the motion vector mask processing portion 151 determines whether or not the motion vector VD is a motion vector VD of a pixel block in which the above flag is set to "1".

For the motion vector of the pixel block in which the flag is "1", the motion vector mask processing portion 151 outputs the motion vector to the optimal shutter speed calculation/determination portion 152 and the motion vector correcting portion 153 in post stages without changing the value.

In addition, for the motion vector of the pixel block in which the flag is "0", in step S15, the motion vector mask processing portion 151 performs mask processing that sets the value of the motion vector to zero or invalidates the value, and outputs the motion vector to the optimal shutter speed calculation/determination portion 152 and the motion vector correcting portion 153 in the post stages.

Figure 7:
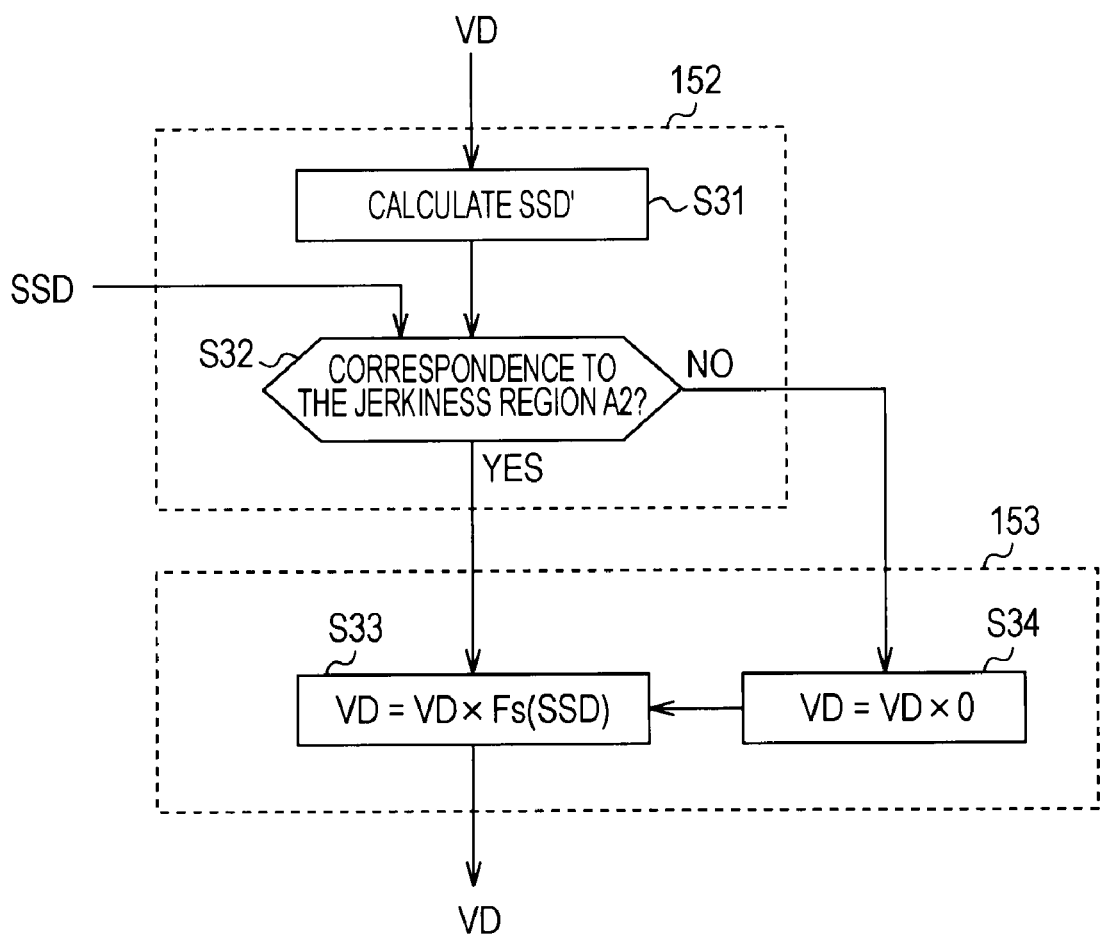
FIG. 7 is a schematic diagram showing a specific processing process concerning an optimal shutter speed calculation/determination portion and a motion vector correcting portion.

Next, a processing process concerning the optimal shutter speed calculation/determination portion 152 and the motion vector correcting portion 153 will be described using FIG. 7.

Figure 8:
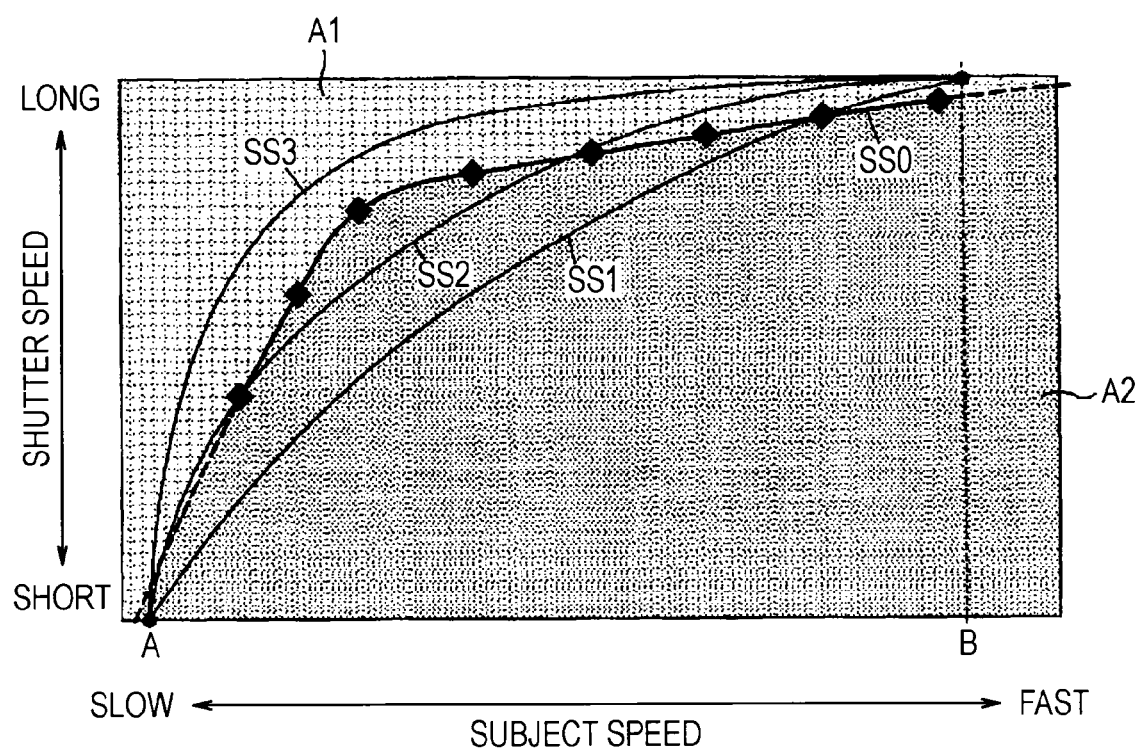
FIG. 8 is a graph showing an optimal shutter speed curve according to a subject speed.

As step S31, the optimal shutter speed calculation/determination portion 152 calculates an optimal shutter speed according to the motion vector of each pixel block in the processing object frame on the basis of the evaluation index shown in, for example, FIG. 8.

Here, FIG. 8 is a graph showing a subject speed representing a moving speed of a moving body which is detected as a motion vector, and an optimal shutter speed curve according to the subject speed. In addition, the optimal shutter speed is a shutter speed which is in accordance with the moving speed of the subject, in which it is difficult to feel jerkiness deterioration based on visual characteristics, and in which it is difficult to feel also blurring deterioration having insufficient subject details and subject unclearness caused by adding excessive motion blurring. In other words, when an image of the subject is taken at a shutter speed faster than the optimal shutter speed, it can be determined that jerkiness deterioration occurs in the image taken. On the other hand, when an image of the subject is taken at a shutter speed slower than the optimal shutter speed, it can be determined that blurring deterioration occurs in the image taken.

Accordingly, by correlating the motion vector of each pixel block with a subject speed in FIG. 8, the optimal shutter speed calculation/determination portion 152 calculates the optimal shutter speed according to the motion vector of each pixel. Meanwhile, an optimal shutter speed curve SSO, indicated by the solid line in FIG. 8, represents an example of correspondence between an arbitrary subject speed and the optimal shutter speed, and is specifically a curve connecting experimental results obtained by a psychological experiment. Here, a motion blurring region A1 shown in FIG. 8 is determined on the basis of the optimal shutter speed curve SSO to be a region excessively including motion blurring based on motion of the subject. Similarly, a jerkiness region A2 is determined on the basis of the optimal shutter speed curve SSO to be a region which does not have any motion blurring based on motion of the subject, and in which jerkiness deterioration occurs based on visual characteristics.

In the case of determining the optimal shutter speed according to a motion vector by directly using the optimal shutter speed curve SS0 indicated by the solid line, by storing beforehand optimal shutter speed information according to motion vectors in any scale in the form of a table on a storage medium, this recording medium may be referred to.

In addition, in this embodiment, by using a function approximating the optimal shutter speed curve indicated by this solid line, the optimal shutter speed according to a motion vector may be calculated. In this case, the optimal shutter speed calculation/determination portion 152 calculates an optimal shutter speed SSD' by using an approximate function of the optimal shutter speed curve which is represented by the following expression (3), where a motion vector of a pixel block is v.

[Expression 3]

$$SSD' = \left(\frac{v-A}{B-A}\right)^\gamma \times (v-A) + A \qquad \text{Expression (3)}$$

Meanwhile, regarding parameters A, B, γ in the above expression (3), appropriate values may be selected and used in accordance with a curve shape of the optimal shutter speed curve shown in FIG. 8. As a specific example of the shutter speed curve, FIG. 8 shows curve shapes SS1 to SS3 in a case where, among the parameters in expression (3), values A and B are fixed and γ is changed in three levels.

When the optimal shutter speed SSD' according to the motion vector is calculated, in step S32, by comparing the optimal shutter speed SSD' and the shutter speed SSD which is supplied from the decoding processing unit 130 and which was actually used for imaging, the optimal shutter speed calculation/determination portion 152 determines whether or not correspondence to the jerkiness region A2 shown in FIG. 8 is established in units of pixel blocks.

From this determination result, in the pixel block subject to current processing, when the shutter speed SSD is faster than the optimal shutter speed SSD', and corresponds to the jerkiness region A2, the motion vector correcting portion 153 proceeds to step S33. In addition, in the pixel block subject to current processing, when the shutter speed SSD is slower than the optimal shutter speed SSD' and does not correspond to the jerkiness region A2, the motion vector correcting portion 153 proceeds to step S34.

In step S33, since jerkiness deterioration occurs in the pixel block to be processed, the motion vector correcting portion 153 performs, for example, processing that multiplies the value of the motion vector by a function fs(SSD) in which its value increases with an increasing shutter speed SSD and converges to 1.

Meanwhile, the motion vector correcting portion 153 may perform multiplication processing by using, instead of the function fs(SSD), fs(VD) in which a motion vector VD is a variable, or fs(SSD, VD) in which the shutter speed SSD and the motion vector VD are two variables.

In step S34, since no jerkiness deterioration occurs in the pixel block to be processed, the motion vector correcting portion 153 performs, for example, mask processing that establishes invalidation by multiplying the value of the motion vector by 0.

In this manner, the optimal shutter speed calculation/determination portion 152 determines whether or not jerkiness deterioration occurs by considering the shutter speed SSD when a moving image, which is to be processed, was actually taken. Additionally, since the motion vector correcting portion 153 performs correcting processing that adds appropriate motion blurring to the motion vector of the pixel block determined to have jerkiness deterioration, motion blurring adding processing can be performed so that a more natural moving image is obtained based on visual characteristics.

In this embodiment, shutter speed information has been described as an example of imaging information representing an imaging condition that change the degree of motion blurring of an image represented by image data. However, motion vector correction may be performed by using imaging information representing the following imaging condition.

In other words, in a case where image data is taken by an imaging apparatus having an aperture mechanism that controls the amount of exposure by limiting the amount of light incident on an imaging element, in the motion blurring adding processing unit 150, on the basis of, as imaging information, aperture information representing an aperture value F at the time image data was taken, the motion vector may be corrected. Specifically, an image represented by image data taken under the condition of a large aperture value F and a deep depth of field has a feature in which jerkiness deterioration is easily noticeable since an image region having high spatial contrast increases. Therefore, the motion blurring adding processing unit 150 may perform correcting processing that multiplies the value of the motion vector by a function in which its value increases in accordance with an increase in the aperture value F and converges to 1.

In addition, in a case where image data is taken by an imaging apparatus having a blurring correcting mechanism that corrects blurring of an image taken in accordance with an angular velocity detected by a gyroscope, the motion blurring adding processing unit 150 may correct the motion vector on the basis of, as imaging information, angular velocity information representing the angular velocity detected by the gyroscope when this image data is taken. Specifically, an image represented by the image data taken on an imaging condition in which the angular velocity detected by the gyroscope is large has a feature in which a motion in the screen is large and jerkiness deterioration is easily noticeable. Therefore, the motion blurring adding processing unit 150 may perform correcting processing that multiplies the value of the motion vector by a function in which its value increases with an increasing angular velocity detected by the gyroscope and converges to 1.

In addition, in a case where image data is taken by an imaging apparatus having a zoom function that magnifies the subject, the motion blurring adding processing unit 150 may correct the motion vector on the basis of, as imaging information, zoom information representing a magnification factor of a zoom function provided in the imaging apparatus at the time the image data was taken. Specifically, an image represented by image data taken under an imaging condition having a large magnification factor has a feature in which a motion in the screen is large and jerkiness deterioration is easily noticeable. Therefore, the motion blurring adding processing unit 150 may perform correcting processing that multiplies the value of the motion vector by a function in which its value increases with an increase in magnification factor and converges to 1.

Meanwhile, the motion blurring adding processing unit 150 may correct the motion vector by combining the shutter speed information, the aperture value information, the angular velocity information, and the zoom information as described above. In addition, the imaging information is not limited to the shutter speed information, the aperture value information, the angular speed information, and the zoom information as described above. Correcting processing on the motion vector may be performed by using other information if it represents an imaging condition that change the degree of image motion blurring represented by the image data.

The filter parameter calculating portion 154 calculates the filter parameters as shown below in units of pixels in order to add motion blurring to each pixel included in the processing object frame.

First, the filter parameter calculating portion 154 uses, as an interest pixel, a pixel having effective motion vector information, and specifies a pixel (hereinafter referred to as a pixel for use in parameter calculation) on the motion vector of each interest pixel. Additionally, the filter parameter calculating portion 154 calculates a filter parameter according to a relative position of the specified pixel for use in parameter calculation for the interest pixel, as described below.

Figure 9:
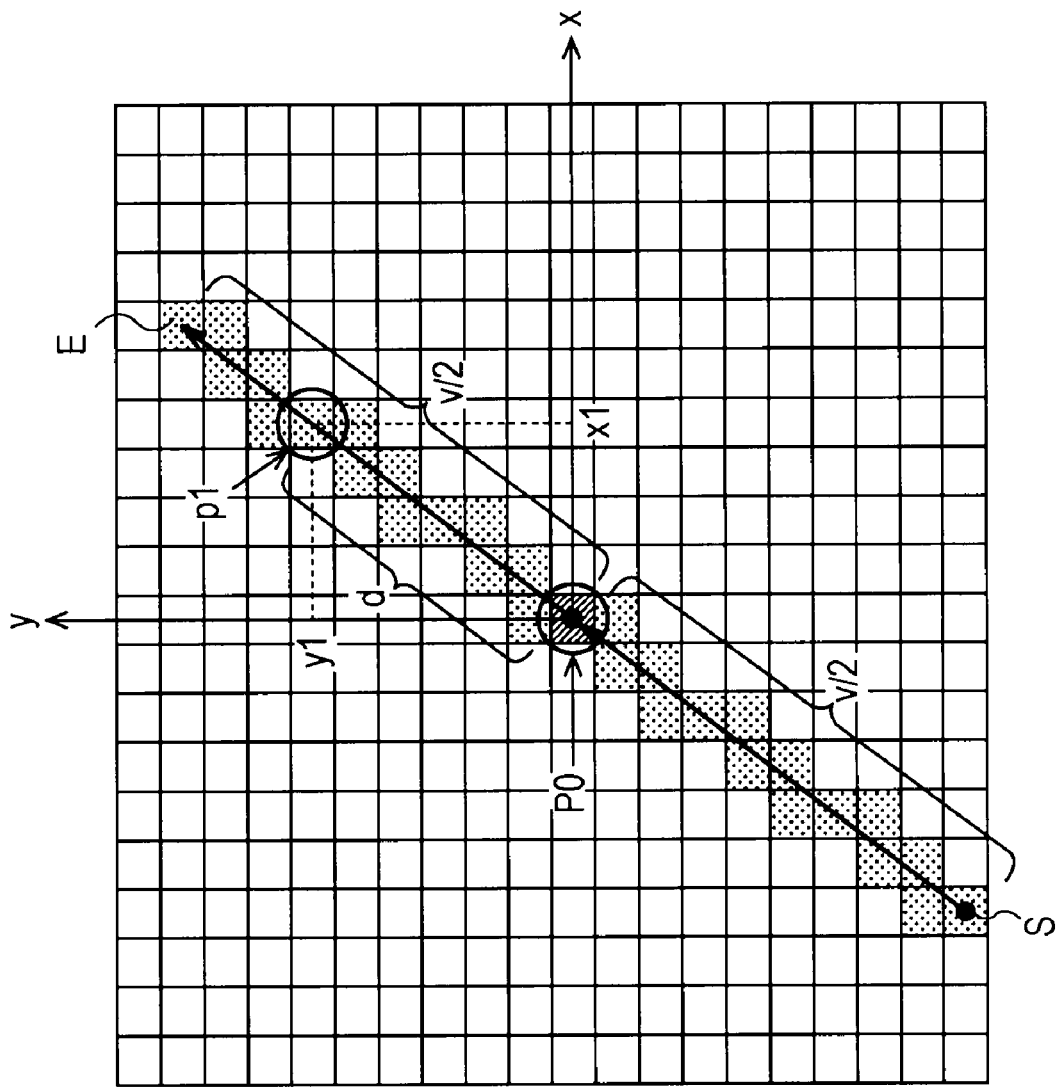
FIG. 9 is a diagram illustrating processing details of a filter parameter calculating processing portion.

In other words, as shown in FIG. 9, the filter parameter calculating portion 154 specifies, as the pixels for use in parameter calculation, all pixels on a vector in which the midpoint between a start point S and an endpoint E is used as the position of an interest pixel P0. Meanwhile, as shown in FIG. 9, an absolute value v is the absolute value of the motion vector of the interest pixel.

Subsequently, in accordance with the absolute value v of the motion vector and a distance d between the pixel position of the interest pixel P0 and the pixel position of a pixel P1 for use in parameter calculation which is specified by the above-described processing, the filter parameter calculating portion 154 calculates a motion blurring adding intensity σ on the basis of the following expression (4).

[Expression 4]

$$\sigma = -0.5 \times (d - 0.5)^2 + 0.5 \times \left(\frac{v}{2}\right)^2 \qquad \text{Expression (4)}$$

Here, expression (4) is set so that a value obtained by raising the intensity σ in the expression to the power of 2 becomes a variance in the Gaussian function in the motion blurring adding filter 155 in the post stage.

In addition, by setting a coordinate point in an orthogonal coordinate plane x-y of each pixel P1 for use in parameter calculation to $(x_1, y_1)$ when the interest pixel P0 is an origin, the filter parameter calculating portion 154 calculates a motion-blurring-adding angular orientation θ on the basis of the following expression (5).

[Expression 5]

$$\theta = \tan^{-1}\left(\frac{y_1}{x_1}\right) \qquad \text{Expression (5)}$$

In this manner, the filter parameter calculating portion 154 specifies the pixels for use in parameter calculation from the motion vector of the interest pixel, sets parameter information (σ, θ) for each specified pixel for use in parameter calculation, and supplies the parameter information to the motion blurring adding filter 155 in units of processing object frames.

Meanwhile, in processing concerning the filter parameter calculating portion 154, for a certain pixel, pixels for use in parameter calculation may be redundantly specified. In this case, in order to simplify processing, for example, from pieces of redundantly specified parameter information, a piece of information in which a has a larger value may be set as parameter information for the pixel. In addition, the filter parameter calculating portion 154 performs smoothing processing, such as Gaussian filter processing and median filter processing, on the parameter information (σ, θ) of each pixel for use in parameter calculation, whereby the image quality of a moving image output from the motion blurring adding filter 155 in the post stage can be enhanced.

In accordance with the parameter information supplied from the filter parameter calculating portion 154, the motion blurring adding filter 155 performs the following spatial filter processing in the processing object frame on a pixel value of each pixel in a frame to be processed of the decoded image data DD supplied from the decoding processing unit 130. In this embodiment, the motion blurring adding filter 155 outputs an image having motion blurring added thereto by executing one or both of the following first filter processing or second filter processing.

First, the first filter processing will be described. In the first filter processing, the motion blurring adding filter 155 receives, as input I(x+i, y+j), a pixel value of a pixel to which motion blurring is added before motion blurring adding filter processing, and a pixel value of a peripheral pixel positioned around this pixel, and outputs a pixel value J(x, y) of the interest pixel obtained after performing filter processing on the basis of the Gaussian function shown in the following expression (6).

[Expression 6]

$$J(x, y) = \left(\frac{\sum I(x+i, y+j) \times e^{\frac{r^2}{2\sigma^2}}}{\sum e^{\frac{r^2}{2\sigma^2}}}\right) \qquad \text{Expression (6)}$$

Meanwhile, the peripheral pixel that serves as input I(x+i, y+j) is set in accordance with an angular orientation in which the motion vector is added. In addition, r represents a distance between the pixel to which motion blurring is added and the peripheral pixel.

Among all the pixels included in the processing object frame, for each pixel in which the parameter information (σ, θ) is set, the motion blurring adding filter 155 updates the pixel value by performing the above-described filter processing. In this manner, the motion blurring adding filter 155 can supply the moving image display output unit 160 with a moving image in which jerkiness deterioration is reduced.

By the way, the peripheral pixels positioned around the interest pixel may include those forming an originally motionless region, that is, those forming a background region. The peripheral pixels positioned in this background region do not need to be originally considered in adding motion blurring to the interest pixel. A processing method that focuses attention to this point is the following second filter processing.

In other words, in the second filter processing, when the value of the motion vector of the interest pixel is 0 or invalid, among peripheral pixels positioned around the interest pixel, in the motion blurring adding filter 155, a pixel value I(x+i$_0$, y+j$_0$) of a pixel in which its motion vector is 0 or invalid is used instead of the pixel value I(x, y) of the interest pixel to calculate a pixel value J(x, y) of the interest pixel on the basis of the above expression (6). In this manner, the motion blurring adding filter 155 outputs an image in which jerkiness deterioration is naturally reduced based on visual characteristics compared with the first filter processing.

As described above, according to the reception/reproduction apparatus 100, the pixel block specifying processing portion 142 compares a motion vector of a processing object frame and the motion vector of a previous frame, and specifies a pixel block having an effective motion vector from a result of the comparison, and the motion vector estimating processing portion 143 estimates a motion vector of a different pixel block from the motion vector of the specified pixel block, whereby, for the entire image region, accurate motion vectors that more faithfully represent actual motion are generated. Thus, in accordance with the generated motion vectors, motion blurring can be added so that a more natural moving image can be formed based on visual characteristics. Therefore, according to the reception/reproduction apparatus 100, from moving image data including jerkiness deterioration, a moving image in which jerkiness deterioration is more naturally reduced based on human visual characteristics can be output.

In addition, according to the reception/reproduction apparatus 100, the optimal shutter speed calculation/determination portion 152 corrects a motion vector in accordance with shutter speed information at the time of taking a moving image, whereby the value of motion blurring adding intensity σ calculated by the filter parameter calculating portion 154 in the post stage is controlled. Thus, appropriate motion blurring can be added by the motion blurring adding filter 155 in accordance with the shutter speed information at the time of taking an image, and an image in which jerkiness deterioration is more naturally reduced based on human visual characteristics can be output.

Meanwhile, in the above-described reception/reproduction apparatus 100 according to this embodiment, instead of spatial filter processing that uses motion vectors to add motion blurring to each unit image, motion blurring may be added to image data by using other motion information.

For example, the reception/reproduction apparatus 100 may perform processing that adds motion blurring to a moving image by performing temporal filter processing that superimposes a plurality of frames on one frame. In this case, after the reception/reproduction apparatus 100 detects, as motion information, a moving body image region on the basis of an interframe difference, and corrects information representing the detected moving body image region on the basis of imaging information, the reception/reproduction apparatus 100 uses the motion information to perform temporal filter processing instead of the motion vector, whereby appropriate motion blurring can be added in accordance with shutter speed information at the time of taking an image, and an image in which jerkiness deterioration is more naturally reduced based on human visual characteristics can be output.

Meanwhile, as a specific example of temporal filter processing, an image processing apparatus that, from images taken at a frame rate of 240 frames per second, outputs a moving image which has a frame rate of 60 frames per second and to which motion blurring is added for reducing such jerkiness deterioration has been earlier filed by the present applicant, and is described in a patent document (Japanese Patent Application No. 2006-096792) that has not been opened on the priority date of this application.

In addition, processing parts constituting the reception/reproduction apparatus 100 are realized by hardware designed by, for example, FPGA or the like. In addition, the image processing process, which is performed by each processing unit, up to outputting decoded image data having motion blurring added thereto from the above-described coded image data may be executed by a computer in accordance with a program.

Second Embodiment

Figure 10:
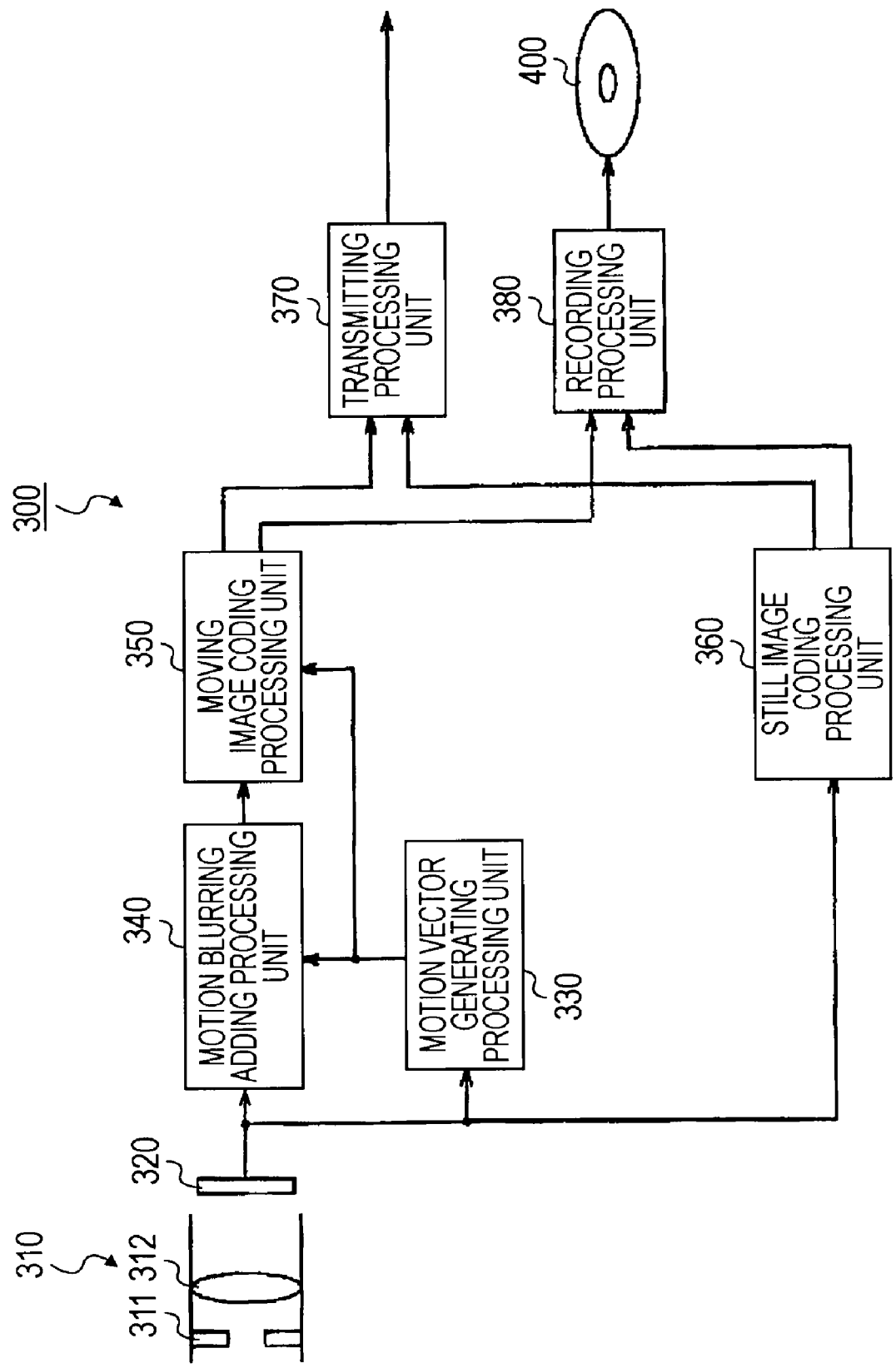
FIG. 10 is a block diagram showing an entire configuration of a transmission/recording apparatus according to a second embodiment.
Figure 11:
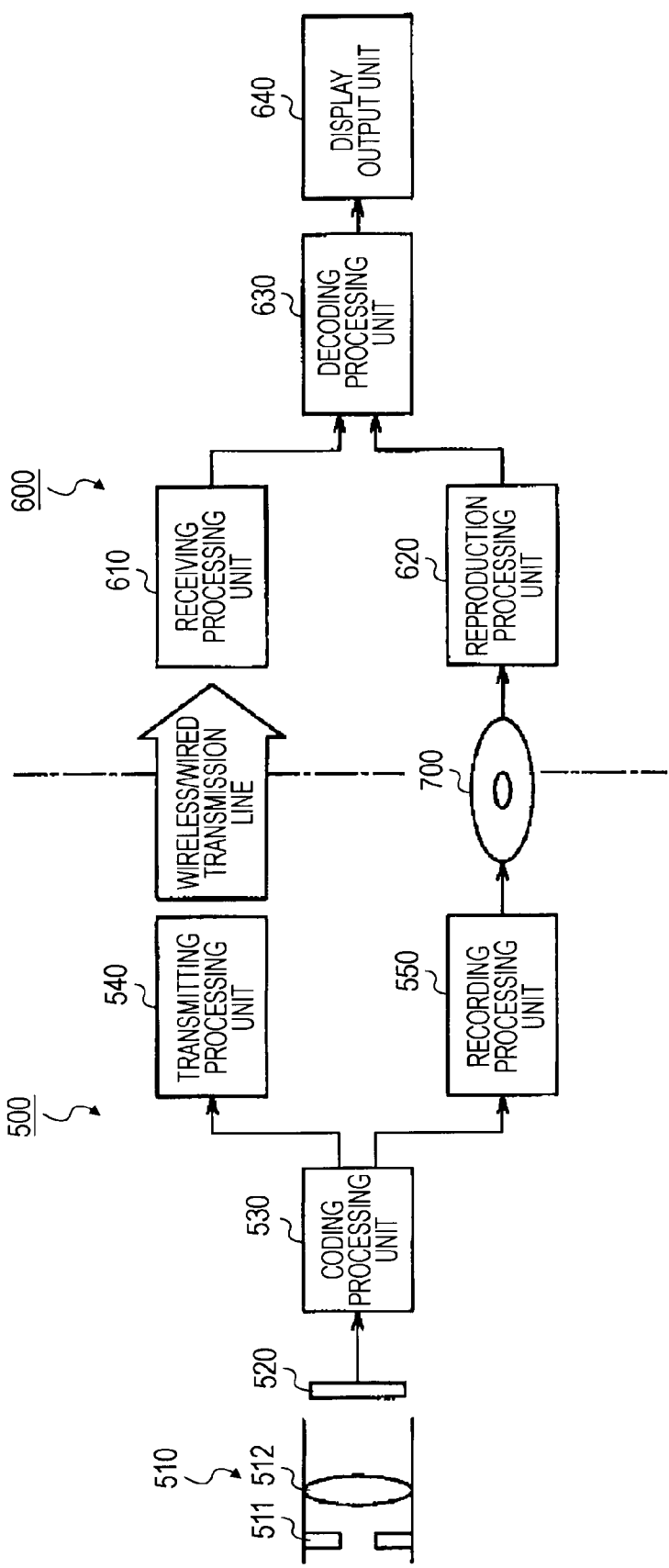
FIG. 11 is a block diagram showing the configurations of a moving imaging apparatus and a moving image reproduction apparatus.

Next, as an image processing apparatus according to a second embodiment to which the image processing apparatus 1 is applied, the configuration of a transmission/recording apparatus 300 shown in FIG. 10 that performs imaging of a subject and performs the above-described motion blurring adding processing on the moving image taken, and that performs processing of transmission to a transmission line or processing of recording to a recording medium 400 such as a DVD will be described.

Similarly to the above-described first embodiment, this embodiment will be described assuming that image data is made up of a progressive format unit image having a frame rate of 60 fps. Meanwhile, the unit image is not limited to the progressive format. A unit image of a moving image may be formed by an interlace system. In addition, the frame rate is not limited only to 60 [fps] used in this embodiment.

The transmission/recording apparatus 300 includes, as shown in FIG. 10, an imaging optical system 310 that collects light from a subject image, an imaging element 320 that receives the light collected by the imaging optical system 310 and that converts the light into an image signal, a motion vector generating processing unit 330 that generates a motion vector from the image signal, a motion blurring adding processing unit 340 that adds motion blurring to the image signal, a moving image coding processing unit 350 that performs predictive coding on the image signal on the basis of motion information such as MPEG, a still image coding processing unit 360 that codes the image signal by using a coding technique such as the JPEG, a transmitting processing unit 370 that transmits the coded image to the exterior via a transmission line, and a recording processing unit 380 that records the coded image data on the recording medium 400.

The imaging optical system 310 includes an aperture mechanism 311 that adjusts the amount of light incident from the exterior, and an optical lens system 312 that collects, on a light receiving surface of the imaging element 320, subject light whose amount is adjusted by the aperture mechanism.

The imaging element 320 receives the light collected by the imaging optical system 310 on the light receiving surface, and converts the light into an image signal. The imaging element 320 supplies the image signal to the motion blurring adding processing unit 340 and the motion vector generating processing unit 330 when the image signal is processed as a moving image. In addition, the imaging element 320 supplies the image signal to the still image coding processing unit 360 when the image signal is processed as a still image.

In order to control the amount of exposure by controlling a shutter speed, the transmission/recording apparatus 300 that includes the imaging optical system 310 and the imaging element 320 as described above has shutter functions realized by an electronic shutter that controls an effective exposure time of an imaging element, a mechanical shutter that allows light from a lens to pass to the side of an imaging element in such a manner that the shutter is released during an effective exposure time by using an opening/closing mechanism, a liquid crystal shutter that allows light from a lens to pass to the side of an imaging element during an effective exposure time by controlling the transmittance of a liquid crystal element, etc.

In addition, the transmission/recording apparatus 300 controls the amount of exposure by using the aperture mechanism 311 to adjust an aperture value F.

Furthermore, the above-described blurring correcting function for correcting blurring in an image taken, and a zoom function for taking an image of the subject in an enlarged manner may be provided in the transmission/recording apparatus 300.

As described above, the transmission/recording apparatus 300 takes an image of the subject by adjusting various types of imaging information representing an imaging condition that change the degree of motion blurring of an image represented by image data, and reports these types of imaging information to the motion blurring adding processing unit 340. Meanwhile, the imaging information may be output in a form in which it is included as meta data in the image signal.

In the following description, it is assumed that jerkiness deterioration occurs concerning the image signal output from the imaging element 320, for example, since the shutter speed is increased in order to control the exposure.

The motion vector generating processing unit 330 uses the following processing to generate a motion vector for each processing object frame from the image data supplied from the imaging element 320, and supplies the motion vector to the motion blurring adding processing unit 340 and the moving image coding processing unit 350.

Specifically, the motion vector generating processing unit 330 is similar in configuration to the motion vector generating processing unit 140 in the above-described first embodiment. With this configuration, for each pixel block included in the processing object frame, an accurate motion vector can be generated. Meanwhile, a description of a specific configuration of the motion vector generating processing unit 330 and processing thereof will be omitted.

In addition, similarly to the first embodiment, in the transmission/recording apparatus 300, instead of performing processing concerning the motion vector generating processing unit 330, by detecting, as motion information, a moving body image region on the basis of an interframe difference, correcting information representing the detected moving body image region on the basis of imaging information, and performing temporal filter processing, appropriate motion blurring can be added in accordance with shutter speed information at the time of taking an image.

For the image data supplied from the imaging element 320, the motion blurring adding processing unit 340 uses the following processing to add motion blurring in accordance with imaging information corresponding to the image data and the motion vector supplied from the motion vector generating processing unit 330. Specifically, the motion blurring adding processing unit 340 is similar in configuration to the motion blurring adding processing unit 150 in the above-described first embodiment. With this configuration, since motion blurring is added in accordance with, for example, shutter speed information at the time of taking a moving image, appropriate motion blurring can be added to the moving image in accordance with imaging information. A moving image in which jerkiness deterioration is more naturally reduced based on human visual characteristics can be output. Meanwhile, a description of a specific configuration of the motion blurring adding processing unit 340 and processing thereof will be omitted.

The moving image coding processing unit 350 codes the image data in which jerkiness deterioration is reduced and which is supplied from the motion blurring adding processing unit 340 by using a coding technique such as the MPEG, and supplies the coded image data to the transmitting processing unit 370 and the recording processing unit 380. Meanwhile, by using the motion vector detected by the motion vector generating processing unit 330 or the motion vector detected from the image data supplied from the motion blurring adding processing unit 340, the moving image coding processing unit 350 generates coding motion vector information.

The still image coding processing unit 360 codes the still image data supplied from the imaging element 320 by using a coding technique such as the JPEG, and supplies the coded still image data to the transmitting processing unit 370 and the recording processing unit 380.

The transmitting processing unit 370 transmits the coded image data to the exterior via a transmission line. In addition, the recording processing unit 380 records the coded image data on the recording medium 400. Meanwhile, it is sufficient for the transmission/recording apparatus 300 to have, as a function of outputting the image data, at least one of the transmitting processing unit 370 and the recording processing unit 380.

In this manner, the transmission/recording apparatus 300 can code image data in which jerkiness deterioration is reduced, as described above, and can perform transmitting processing or recording processing.

Therefore, a reproduction apparatus that reproduces the transmission data transmitted from the transmission/recording apparatus 300 and the recorded data recorded on the recording medium 400 can cause a display apparatus to display a moving image in which jerkiness deterioration is reduced only by performing an existing reproduction processing process without performing motion blurring adding processing.

In addition, in the case of processing, as a still image, the image signal output from the imaging element 320, the transmission/recording apparatus 300 performs transmitting processing or recording processing through the still image coding processing unit 360. In addition, when the transmission/recording apparatus 300 processes, as still image data, the image signal output from the imaging element 320, if the transmission/recording apparatus 300 invalidates processing by the motion blurring adding processing unit 340, the transmission/recording apparatus 300 may perform transmitting processing or recording processing through the moving image coding processing unit 350.

In this manner, only when the transmission/recording apparatus 300 performs image processing by treating, as a moving image, the image data output from the imaging element 320 does the motion blurring adding processing unit 340 perform processing that adds motion blurring to the image data. Thus, for example, in a case where image processing is performed by treating the image data as a still image, recording processing or transmitting processing can be performed on image data having high spatial contrast.

In addition, similarly to the first embodiment, processing parts constituting the transmission/recording apparatus 300 are realized by hardware designed by, for example, FPGA or the like. In addition, an image processing process that each processing part performs up to adding motion blurring to an image signal taken and performing recording processing or transmitting processing may be allowed to be executed by a computer in accordance with a program.

Meanwhile, the present invention is not limited to the above-described embodiments described with reference to the drawings. It is obvious that various modification or replacements, or those equivalent thereto may be performed on the present invention without departing from the scope and spirit of the appended Claims and the spirit thereof.

The invention claimed is:

1. An image processing apparatus for performing image processing on image data which is obtained by performing imaging of a subject and in which a degree of motion blurring of an image represented by the image data changes in accordance with an exposure control parameter at a time of performing imaging of the subject, the image processing apparatus comprising:
    a motion information correcting unit that calculates a correction of motion information corresponding to motion in the image and including as a parameter of the calculation imaging information representing the exposure control parameter; and
    a motion blurring adding unit that adds motion blurring to the image by performing image processing on the image data using the motion information corrected by the motion information correcting unit.

2. The image processing apparatus according to claim 1, wherein the imaging information is information representing a shutter speed at the time of performing imaging.

3. The image processing apparatus according to claim 1, wherein the imaging information is information representing an aperture value at the time of performing imaging.

4. An image processing apparatus for performing image processing on image data which is obtained by performing imaging of a subject and in which a degree of motion blurring of an image represented by the image data changes in accordance with an imaging condition at a time of performing imaging of the subject, the image processing apparatus comprising:
    a motion information correcting unit that corrects motion information representing motion concerning the image on the basis of image information representing the imaging condition;
    a motion blurring adding unit that adds motion blurring to the image by performing image processing on the image data using the motion information corrected by the motion information correcting unit; and
    a motion vector generating unit that generates a motion vector as the motion information from the image data, wherein
    the motion information correcting unit corrects the motion vector generated by the motion vector generating unit by using the imaging information, and
    the motion blurring adding unit performs spatial filter processing on the image data by using the motion vector corrected by the motion information correcting unit.

5. The image processing apparatus according to claim 4, wherein the motion vector generating unit includes:
    a motion vector detecting unit that detects, from the image data, a motion vector of a unit image that serves as an image to be processed;

a pixel block specifying unit that specifies a pixel block having high correlation by comparing, in units of pixel blocks, the motion vector of the image to be processed, the motion vector being detected by the motion vector detecting unit, and a motion vector of an image to be processed prior to the image to be processed; and a motion vector estimating unit that estimates, from a motion vector of the pixel block specified by the pixel block specifying unit, a motion vector of a pixel block different from the pixel block specified.

6. The image processing apparatus according to claim 4, wherein the motion vector generating unit includes:

a motion vector detecting unit that detects, from the image data, a motion vector of a unit image that serves as an image to be processed; and a motion vector smoothing unit that smoothes the motion vector of the image to be processed, the motion vector being detected by the motion vector detecting unit.

7. The image processing apparatus according to claim 4, wherein the motion blurring adding unit includes:

a filter parameter calculating processing unit that specifies a pixel for use in parameter calculation with respect to an interest pixel included in the image to be processed, the pixel for use in parameter calculation being positioned on the motion vector corrected by the motion information correcting unit, and calculates a filter parameter according to a distance from the interest pixel to the pixel for use in parameter calculation; and a motion blurring filter that performs filter processing according to the filter parameter on a pixel value of each pixel included in the image to be processed.

8. The image processing apparatus according to claim 1, wherein the image data is coded by using the motion information, the image processing apparatus further comprises a decoding unit that decodes the image data by using the motion information, and the motion information correcting unit corrects motion information that the decoding unit uses to decode the image data on the basis of the imaging information.

9. The image processing apparatus according to claim 1, wherein the image data is coded by using the motion information, the image processing apparatus further comprises:

a decoding unit that decodes the image data by using the motion information; and a motion information generating unit that generates new motion information from the image data decoded by the decoding unit, and the motion information correcting unit corrects the motion information generated by the motion information generating unit on the basis of the imaging information.

10. The image processing apparatus according to claim 1, wherein, only when image processing is performed with the image data as a moving image does the motion blurring adding unit add motion blurring to the image data.

11. An imaging apparatus, comprising:

an imaging unit that outputs, by performing imaging of a subject, image data in which a degree of motion blurring of an image represented by the image data changes in accordance with an exposure control parameter, the image data being obtained by performing imaging;

a motion information correcting unit that calculates a correction of motion information corresponding to motion in the image and including as a parameter of the calculation imaging information representing the exposure control parameter; and a motion blurring adding unit that adds motion blurring to the image by using the motion information corrected by the motion information correcting unit to perform image processing on the image data.

12. An image processing method for performing image processing on image data which is obtained by performing imaging of a subject and in which a degree of motion blurring of an image represented by the image data changes in accordance with an exposure control parameter at a time of performing imaging of the subject, the image processing method comprising:

calculating a correction of motion information corresponding to motion in the image and including as a parameter of the calculation imaging information representing the exposure control parameter; and adding motion blurring to the image by performing image processing on the image data using the motion information corrected in the calculating step.

13. A program embodied on a non-transitory computer readable medium, that when executed by a computer, causes the computer to execute an image processing method for performing image processing on image data which is obtained by performing imaging of a subject and in which a degree of motion blurring of an image represented by the image data changes in accordance with an exposure control parameter at a time of performing imaging of the subject, the image processing method comprising:

calculating a correction of motion information corresponding to motion in the image and including as a parameter of the calculation imaging information representing the exposure control parameter; and adding motion blurring to the image by performing image processing on the image data using the motion information corrected in the calculating step.

14. The motion processing apparatus according to claim 1, further comprising:

a motion vector generating unit that generates a motion vector as the motion information from the image data, wherein the motion blurring adding unit includes an optimal shutter speed calculation unit that calculates an optimal shutter speed according to the motion vector, and the motion information correcting unit corrects the motion vector by using the calculated optimal shutter speed.

* * * * *